(12) United States Patent
Sundholm (10) Patent No.: US 9,790,024 B2
(45) Date of Patent: Oct. 17, 2017

(54) WASTE HANDLING SYSTEM AND METHOD

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 190 days.

(21) Appl. No.: 13/259,603

(22) PCT Filed: Mar. 16, 2010

(86) PCT No.: PCT/FI2010/050201
§ 371 (c)(1),
(2), (4) Date: Sep. 23, 2011

(87) PCT Pub. No.: WO2010/112668
PCT Pub. Date: Oct. 7, 2010

(65) Prior Publication Data
US 2012/0010746 A1   Jan. 12, 2012

(30) Foreign Application Priority Data

Apr. 3, 2009 (FI) ...................................... 20095369
May 19, 2009 (FI) ...................................... 20095553

(51) Int. Cl.
*B65D 33/16* (2006.01)
*B65F 1/14* (2006.01)
*B07C 5/34* (2006.01)

(52) U.S. Cl.
CPC .......... *B65F 1/1484* (2013.01); *B07C 5/3412* (2013.01); *B65F 2210/112* (2013.01); *B65F 2210/1125* (2013.01); *B65F 2210/128* (2013.01)

(58) Field of Classification Search
USPC ......................................................... 705/308
See application file for complete search history.

(56) References Cited

U.S. PATENT DOCUMENTS

| 5,251,761 | A | 10/1993 | Hansen et al. |
| 6,595,550 | B1 | 7/2003 | Meazzi |
| 6,957,777 | B1 | 10/2005 | Huang |
| 8,550,252 | B2 * | 10/2013 | Borowski ............. G06Q 99/00 209/3 |
| 2004/0046672 | A1 * | 3/2004 | Kasik et al. ................. 340/612 |

(Continued)

FOREIGN PATENT DOCUMENTS

| CN | 1946085 A | 4/2007 |
| CN | 1989518 A | 6/2007 |

(Continued)

*Primary Examiner* — Jan P Mincarelli
(74) *Attorney, Agent, or Firm* — Birch, Stewart, Kolasch & Birch, LLP (57) ABSTRACT

A method and a waste handling system, wherein waste or recyclable material is transported in carrier bags, bags or sack to a disposal point, and from there onwards by a transport vehicle for further processing. An RFID identifier is used in connection with the carrier bag, bag, or sack, or used in waste transport. A closing member is provided with an RFID) identifier used in closing, or as verification of the closing of the carrier bag, bag, sack. A sensor is arranged in connection with, or in the proximity of, a disposal point, such as a waste room, of the waste system. Information read from the RFID identifier by the sensor is transmitted to a control unit, that is fitted to control the waste transport system based on the information given by the RFID identifier.

26 Claims, 5 Drawing Sheets

(56) References Cited

U.S. PATENT DOCUMENTS

| | | | |
|---|---|---|---|
| 2006/0006987 A1* | 1/2006 | Hashimoto | G06K 7/0008 340/10.51 |
| 2006/0187058 A1* | 8/2006 | Regard | G06Q 20/203 340/572.8 |
| 2007/0080223 A1 | 4/2007 | Japuntich | |
| 2007/0260466 A1* | 11/2007 | Casella et al. | 705/1 |
| 2008/0197059 A1* | 8/2008 | Mallett | B07C 5/3412 209/702 |
| 2009/0051490 A1* | 2/2009 | Childress et al. | 340/5.92 |
| 2009/0268989 A1* | 10/2009 | Berland | B65D 33/1675 383/5 |

FOREIGN PATENT DOCUMENTS

| | | |
|---|---|---|
| ES | 2 320 289 A1 | 5/2009 |
| GB | 2 402 704 A | 12/2004 |
| GB | 2 449 710 A | 12/2008 |
| JP | H11106004 A | 4/1999 |
| JP | 2000-25796 A | 1/2000 |
| JP | 2004-175556 A | 6/2004 |
| JP | 2004175556 A | 6/2004 |
| JP | 2004224544 A | 8/2004 |
| JP | 2006182557 A | 7/2006 |
| KR | 10-2010-0001711 A | 1/2010 |
| TW | 305859 U | 2/2007 |
| WO | 02/00530 A1 | 1/2002 |
| WO | 2005/118435 A1 | 12/2005 |
| WO | WO 2006/096101 A1 | 9/2006 |

* cited by examiner

WASTE HANDLING SYSTEM AND METHOD

BACKGROUND OF THE INVENTION

The invention relates generally to waste handling and more particularly to waste sorting and waste transport management and the optimization of waste transport.

Nowadays it is typical, e.g. in respect of household waste, that households use as waste bags different bags, sacks or carrier bags, in which waste is placed. For example, in Finland it is normal to use plastic carrier bags from shops, in which shopping has been carried home, as waste bags. Wastes are carried in plastic carrier bags to a waste bin, into which typically the bag, and its contents, closed with a knot is placed. The wastes are transported onwards by garbage truck for further processing. In modern systems one disadvantage, among others, is that the sorting of wastes is awkward. It is often possible that users do not bother to sort wastes into different allotments, but instead mix all wastes in the same waste bag or waste bin. In this case mixed waste is produced, the reclamation of which is difficult.

Known in the art are solutions for sorting waste, in which solutions different types of waste are arranged to be transported in different containers, such as in waste bags or bins of different colors. For example, households place different types of wastes in waste bags of different colors. A waste bag of a specific color is specified for each type of waste. Wastes are transported e.g. in a normal garbage truck to a waste center, where the wastes are sorted into different allotments on the basis of the colors of the waste bags. The sorting of waste optically is described in publication EP0759816. A drawback here is that there must be waste bags separately arranged for the purpose for each waste type to be sorted. Another drawback is also the uncertainty of operation of the automatic optical sorting apparatus used in sorting the waste bags in a dirty environment. The sorting of waste is described in publication WO03039773 A1.

On the one hand, nothing guarantees that a waste producer, such as a household, will use a waste bag of the correct color for each type of waste. It is difficult to get misusers of the system to change their habits. On the other hand, identifying or tracing a misuser after the event is almost impossible.

Furthermore, it is typical when using plastic carrier bags or plastic bags as waste bags that the knot made in the bag, e.g. from the carrying handles, opens, in which case the wastes can spread freely during transportation to outside the bag. This makes the transport vehicle, the waste bin and/or other waste bags dirty on the outside, hampering the sorting process and also forming a hygiene problem. The waste bags end up nowadays, with the waste they contain, at a landfill site, which is a considerable problem.

Also known in the art are systems for managing waste transport and for receiving more waste transport information, wherein the waste bins emptied into a garbage truck are provided with electronically readable identifiers. In this case information about which waste bins have been emptied is received and the information transferred to an information system. The routes and visits of garbage trucks are, however, mainly based on regular schedules and it has not been possible to optimize transports well enough.

The aim of the invention is to achieve a new type of solution, by means of which the problems of prior art can be avoided.

BRIEF DESCRIPTION OF THE INVENTION

The invention is based on a concept wherein wastes, more particularly waste bags, are provided with an RFID identifier and the waste space, in which waste bins are situated, are provided with a sensor that reads the information of the waste, more particularly of the RFID identifier of the waste bag. The information read by the sensor is transmitted to a control system.

The solution according to the invention has a number of important advantages. By using a closing means according to the invention, it is ensured that on the one hand waste bags, waste carrier bags, waste sacks or corresponding stay closed in transportation, and also the operation of the system, such as more effective sorting than earlier, can be controlled by means of an RFID identifier. Arranging an RFID identifier in a closing means enables the use of any bag, carrier bag, sack, or corresponding whatsoever in waste transport and does not require separate transport containers specially intended for certain waste allotments. According to one preferred embodiment of the invention, a reader of an RFID identifier is in connection with a waste disposal point, preferably in connection with a waste room. In this case only one disposal point can be conveniently used for different materials in connection with the waste transport system, in which case wastes are sorted in the system later, e.g. in a waste center, a sorting center or corresponding, into different allotments according to an RFID identifier. At the same time, feeding waste material without an RFID identifier according to the invention into a disposal point of the system can if necessary be prevented, e.g. by arranging the door of the waste room to open only by means of an RFID identifier.

An RFID identifier can be used to register the amount of waste brought by a certain user, in which case invoicing principles can be changed. On the other hand, a user can be rewarded for sorting waste, e.g. by reducing the waste transport fees of waste that is fit for recycling.

According to a typical embodiment, the closing means is a sticker tape, which is an RFID sticker tape of the color of the waste allotment, which sticker tape also comprises e.g. a text identifier according to the type of waste. In addition, an identification number or other identifier, which is separately specified according to each household, housing company or company that produces waste, or according to each other waste producer, can be formed for a closing means and/or for an RFID identifier. A closing means can also comprise a picture or drawing of the waste type in connection with which the closing means in question is intended to be used.

The invention can thus be utilized by using the ordinary plastic carrier bags of a shop, which are closed with a closing means according to the invention. The carrier bag is filled with waste and closed by knotting its carrying loops. A typical way is to tie at first one knot, after which a closing means, preferably a sticker tape, is placed on top of the knot, and fixed over the knot of the carrier bag. After that a second knot is made with the carrying loops. The RFID identifier in this case remains partly protected and avoids transport damage. The closing means according to the invention also prevents the opening of the knots of the waste bag.

In the waste sorting center to which the waste bags are transported conventionally with garbage trucks or in some other way, such as with a pneumatic waste transfer system, the waste bags are sorted into different waste allotments on the basis of the information given by the RFID identifiers. After this the waste bags are ripped open and the bags are removed from the rest of the waste. In this case it is possible to avoid bags ending up at a landfill site. The material of the bags can be recycled and reused. The RFID identifier of the closing means according to the invention can still be used as a verification, by the aid of a reader means, that the waste bags have been removed from the sorted waste allotment.

A dedicated closing means comprising an RFID identifier is arranged for each waste allotment. Recyclable paper, for instance, is handled in a corresponding manner. In this case paper, such as newspapers, is placed in a bag and it is closed with a closing means according to the invention, which closing means comprises an RFID identifier.

The closing means according to the invention can be supplied as a web comprising a number of closing means, e.g. arranged into a roll. This type of closing means roll preferably comprises a cutting point between each two consecutive closing means. Cutting the closing means can be facilitated by arranging perforation or corresponding in the roll to facilitate detaching a closing means from the roll. The closing means according to the invention can be supplied as sheet comprising a number of closing means. This type of closing means sheet comprises a cutting point between each adjacent closing means. A closing means sheet preferably comprises a base part, which protects the adhesive surface of the closing means. Perforation or corresponding is preferably formed in the base part of the closing means to facilitate detaching a closing means from the sheet. Typically there is a cut between closing means, which extends to the base part from the surface of the closing means, but not through the base part. In this case the closing means are easy to detach from the closing means sheet.

By using closing means according to the invention, the operation of the waste transport system can be optimized more accurately than earlier.

An RFID identifier can also report the filling degree of a waste bin or of a waste disposal point. In this case the transportation of waste can be optimized. Transport is performed only if the filling degree is exceeded. This saves energy and reduces emissions. An RFID identifier can also report the contents of waste. If the waste contains something decomposable, a collection can be requested for the location. An RFID identifier can also give a temperature alarm, i.e. a fire alarm. An RFID identifier can also report when waste has been put into a waste bin and into which waste bin, in which case in which case information about waste quantities, types and trends is obtained.

Using a closing means according to the invention in pneumatic pipe transport has the advantage that a dedicated disposal point for different allotments is not needed, but instead all waste goes to the same disposal point. In normal waste transport waste containers of only a single type are needed, and only one garbage truck collects them instead of 3-4 trucks. It is also advantageous if all wastes, such as mixed waste, biowaste, glass waste, metal waste and paper waste, are placed into a bag. In this case the allotments stay clean and their transportation is easier. The bag is automatically removed in a sorting center.

The invention can be applied according to one preferred embodiment so that dedicated closing means, which comprise RFID identifiers, are supplied to each household or other waste-producing community or corresponding. This assists sorting. In addition, by means of the combination of the closing means and RFID identifier according to the invention, it is easy to demonstrate where the costs of the waste handling system are generated. Fees can be allocated to waste producers more accurately than earlier.

According to one preferred embodiment, households have a fixed waste charge and receive a credit for each waste bag sorted in a sorting center. Based on the automatic reading of RFID identifiers, the system can allocate the sorted wastes by means of an information system so that the credit goes to the correct target.

Sorting in a sorting center on the basis of an RFID identifier is very easy, as also is identification of a household. Arranging an RFID identifier in a closing means thus gives numerous opportunities in waste sorting.

BRIEF DESCRIPTION OF THE FIGURES

In the following, the invention will be described in detail by the aid of some embodiments with reference to the attached drawings, wherein.

DETAILED DESCRIPTION OF THE INVENTION

A producer of waste, such as a household, company or other community, pre-sorts the wastes that it brings into waste bags 1 and provides each bag 1 containing a sortable waste type with a closing means 2 comprising an RFID identifier 3 according to the type of waste. The types of waste can be e.g. mixed waste, biowaste, paper, glass, metal, cardboard, hazardous waste, etc. There is a dedicated closing means for each type of sortable waste, i.e. waste allotment, in which closing means the type of waste the closing means in question is intended for can be visually seen or otherwise sensed. In addition, the closing means comprises a customer code or corresponding, which is individual to each waste-producer community, such as to a household, company or other community. The corresponding information is coded into the memory of the RFID identifier.

A waste producer, such as a household, takes a waste bag provided with a closing means according to the waste type to a disposal point of the system, such as to a waste bin B1, B2, B3, B4, B5, B6 situated in a waste room WR1, WR2, WR3. In the disposal point, or in the proximity of it, such as in a waste room, is a sensor S1, S2, S3, i.e. a reader of an RFID identifier, which reads the information, or at least a part of the information, of the RFID identifier of the closing means of each waste bag brought to the disposal point. The sensor S1, S2, S3 is preferably of a type that is able to read the information in the memory of an RFID identifier 3 remotely from a sufficiently long distance.

Information from a sensor S1, S2, S3 of a disposal point is transmitted e.g. to the control system CS, typically to a database, of the system, on the basis of which information the filling degree of the waste bins of each disposal point, i.e. waste room or corresponding, is known, e.g. on the basis of the number of waste bags of a waste type.

Figure 1:
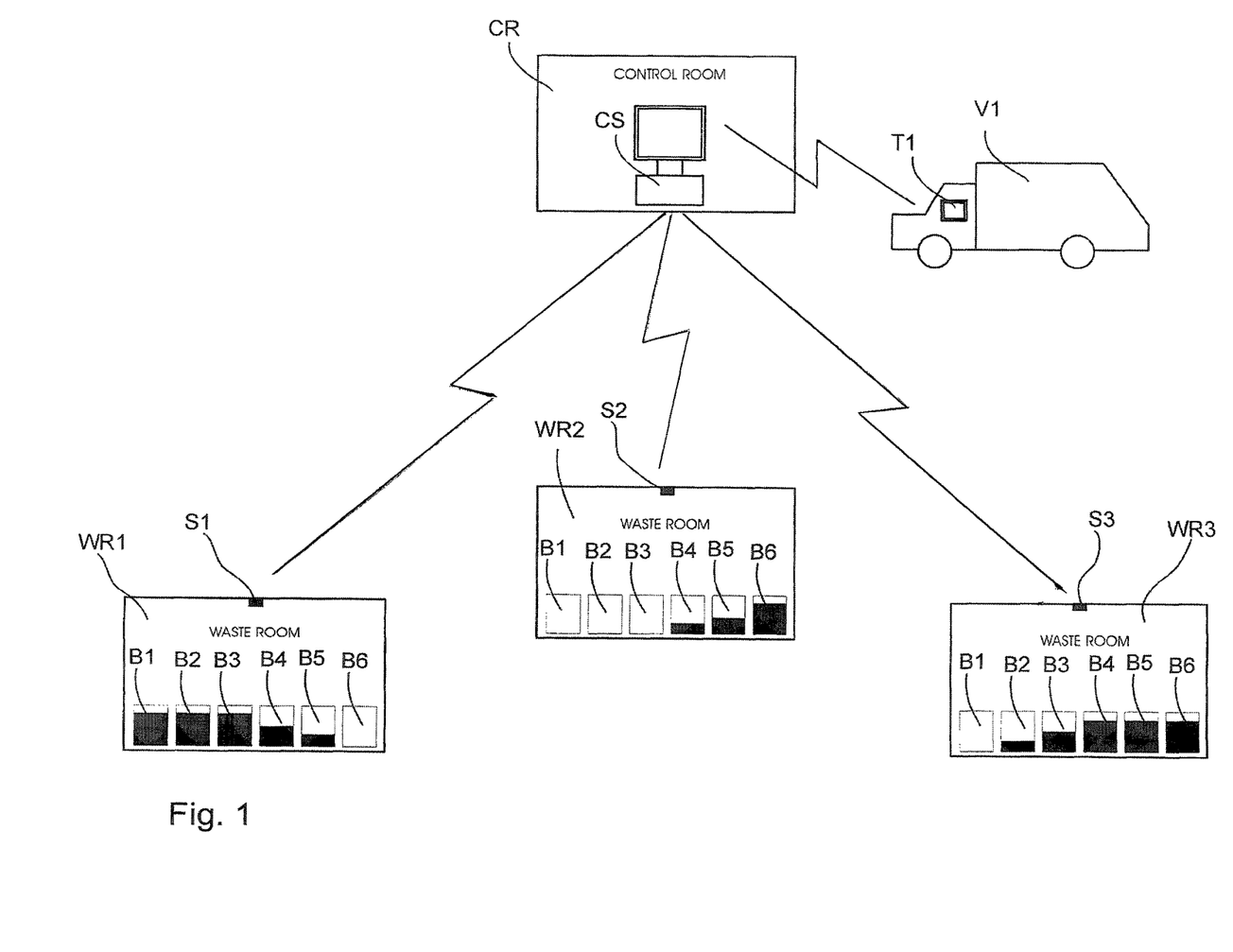
FIG. 1 presents one system according to the invention as a simplified diagram.

In FIG. 1 the filling degree of the waste bins of the waste rooms WR1, WR2, WR3 are marked in simplified form with black color. The larger the part of a bin is black in color, the fuller the bin is.

Figure 2:
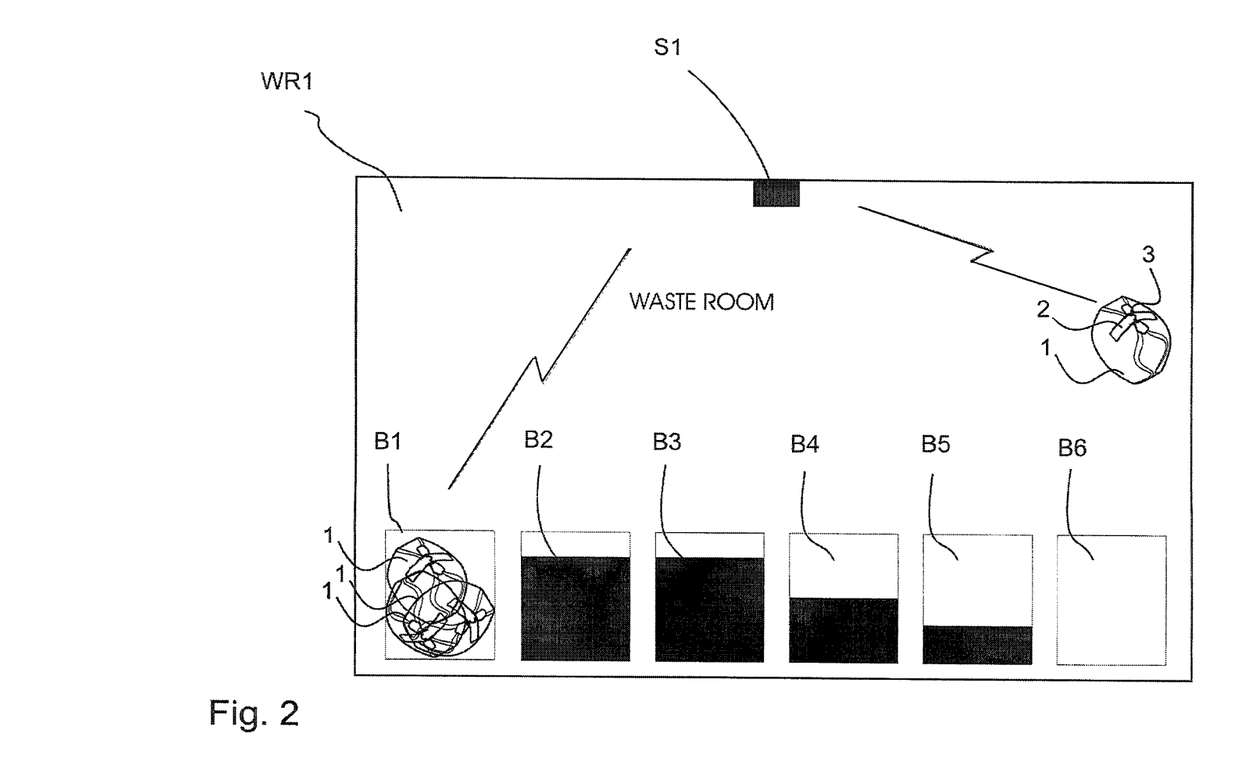
FIG. 2 presents a detail of a system according to the invention.

FIG. 2 presents a disposal point, such as the space of a waste room WR1, of the system in more detail. The waste room comprises a number of waste bins B1-B6, into which the wastes or recyclable materials placed into waste bags 1 are brought. When bringing into the waste room, or at regular intervals, the sensor S1, i.e. the reader of an RFID identifier, reads the information, or a part of it, that is in the memory of the RFID identifier 3 of the closing means 2 of the waste bag 1. The information is transmitted from the sensor 1 to the database of the control system, on the basis of which the control system CS estimates, among other things, the filling degree of the waste bins B1-B6 of the waste room. In addition, the control system is therefore aware of, among other things, the amount of waste bags of each waste allotment in the waste room. FIG. 2 presents as an example a number of waste bags 1 in a first waste bin B1. The filling degree of the second waste bin B2 and of the third waste bin B3 is high, approx. 80%, and they are almost full. The filling degree of the fourth waste bin B4 is approx. 50%. The filling degree of the fifth waste bin B5 is approx. 30%. The sixth waste bin B6 is empty.

As can be seen in FIG. 1, communication links are provided between the central control unit CS and a terminal T1 in one or more of the waste transport vehicles V1, or a driver of a specific one of the waste transport vehicle V1, between the central control unit CS and the sensors S1, S2, S3, attached to each of the disposal points WR1, WR2, WR3 located at sites away from the central control unit CS. In addition, as can be seen in FIG. 2, communication links are provided between the sensor S1 and the RFID identifier 3 on each of the bags or sacks 1 at the each of the disposal points WR1, WR2, WR3.

Information from the sensors S1, S2, S3 can be transmitted to the control system CS wirelessly or by wireline, using data transfer methods and systems that are in themselves prior art.

The connection can also be bidirectional, in which case information coming from the sensors S1, S2, S3 can be saved in the memory of an RFID identifier 3. In this case the sensor S1, S2, S3 is not just a reading device but instead is a reading/transmission device.

Since there is information in the control system CS about the situation of each waste disposal point, such as about the filling degree of the bins B1-B6 of the waste rooms WR1, WR2, WR3, about the quantities of the different types of wastes in the disposal point in question, about the time when each waste bag 1 was left in the disposal point, by means of the system the waste transport vehicles, such as garbage trucks V1, can be controlled more accurately than earlier. In addition, the waste transport can be optimized in many advantageous ways.

The control system CS can transmit the necessary information to a terminal device T1 of a transport vehicle or of the driver of a transport vehicle. The information is typically transmitted, in ways that are in themselves prior art, wirelessly from the control system to the terminal device T1. The data transmission in FIG. 1 is described in a simplified way.

A garbage truck V1 collects wastes from a disposal point, e.g. by emptying the containers into the transport container of the garbage truck. On the basis of the information in the control system CS, it is known accurately in advance which waste types and how much of the wastes is in each disposal point. In this case it is accurately known which wastes have been placed into which garbage truck for transportation. On the one hand, use of the transport space of a garbage truck can be optimized. Since it is known to what extent there is space left in a transport vehicle, it is possible to visit and collect from a disposal point in the neighborhood of the location point of the garbage truck an amount to supplement the load, which amount is known by the control system and which still fits into the load of the garbage truck. In this case, on the one hand, the distance traveled by a garbage truck V1 and also the transport space in use can be optimized. On the other hand, a transport route can be optimized, because there is no need to go and empty the waste bins B1-B6 or the bins of a certain waste type if they are very unfilled, when it is known that at some disposal point there are no wastes or very little of them.

An RFID identifier can thus also report the filling degree of a waste bin or of a waste disposal point. In this case the transportation of waste can be optimized. Transport is performed only if the filling degree is exceeded. This saves energy and reduces emissions. An RFID identifier can also report the contents of waste. If the waste contains some waste that needs transport quickly, e.g. decomposable, etc., a collection can be requested for the location, under the control of the control system. An RFID identifier can also give a temperature alarm, i.e. a fire alarm. An RFID identifier can comprise information on when waste has been placed into a waste bin and into which waste bin, in which case information about waste quantities, types and trends is obtained.

According to one preferred embodiment, in normal waste transport only a single type of waste containers is needed and only one garbage truck collects them instead of 3-4 trucks. It is also advantageous if all wastes, such as mixed waste, biowaste, glass waste, metal waste and paper waste, are placed into a bag. In this case the allotments stay clean and their transportation is easier. The bag is automatically removed in a sorting center.

Figure 3:
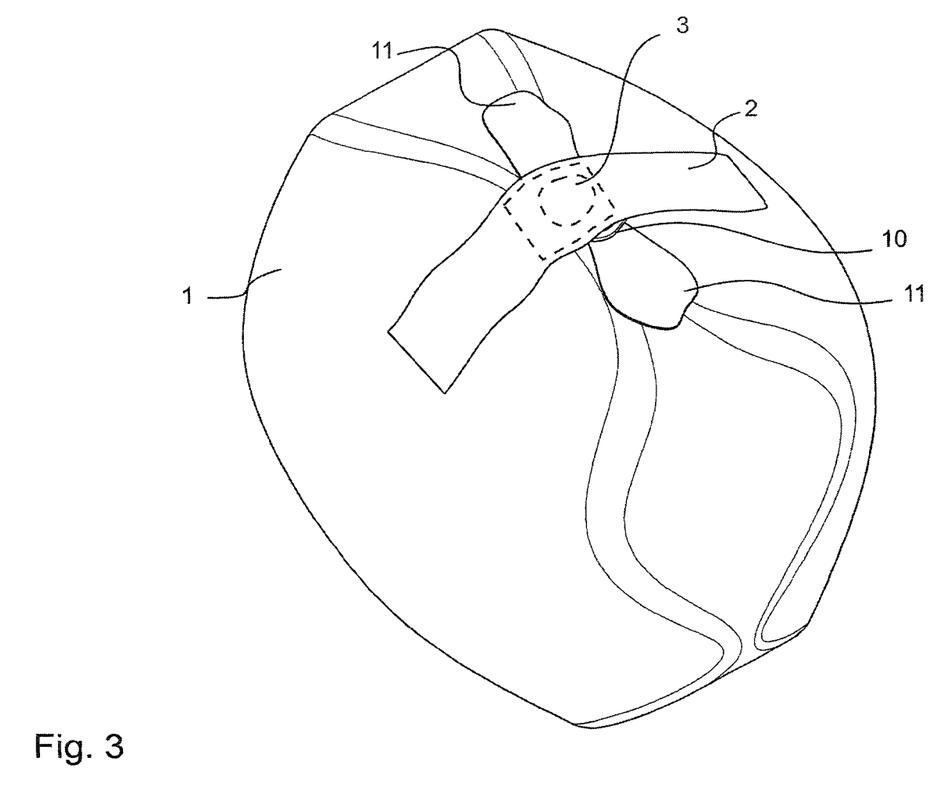
FIG. 3 presents one embodiment of a closing means applicable in a system according to the invention, in connection with a waste bag.

FIG. 3 presents a waste bag 1, to which a closing means 2 is fixed, which closing means is provided with an RFID identifier 3. The closing means 2 is arranged in the embodiment of the figure over the knot 10 formed in the waste bag 1, in which case it prevents opening of the knot 10 during transportation. The knot 10 is formed e.g. by knotting the carrying loops 11 of the bag 1. The closing means 2 comprises an adhesive surface on the side against the outer surface of the bag 1, in which case it sticks to the outer surface of the bag.

The closing means in the case comprises a base part, onto which the RFID identifier 3 is arranged in a manner that is, in itself, known in the art. The base is preferably sticker laminate or corresponding, which can easily be fixed to the waste bag easily owing to the adhesive surface. The RFID identifier comprises a memory part (chip) and an antenna part. The RFID identifier is preferably a passive RFID identifier, in which case it does not need its own power source.

Alternatively, the closing means 2 can be used as a conventional closer of the mouth part of a waste sack, by winding it tightly around the mouth part. If so desired, the mouth part can still be knotted or provided with an additional closer.

Figure 4:
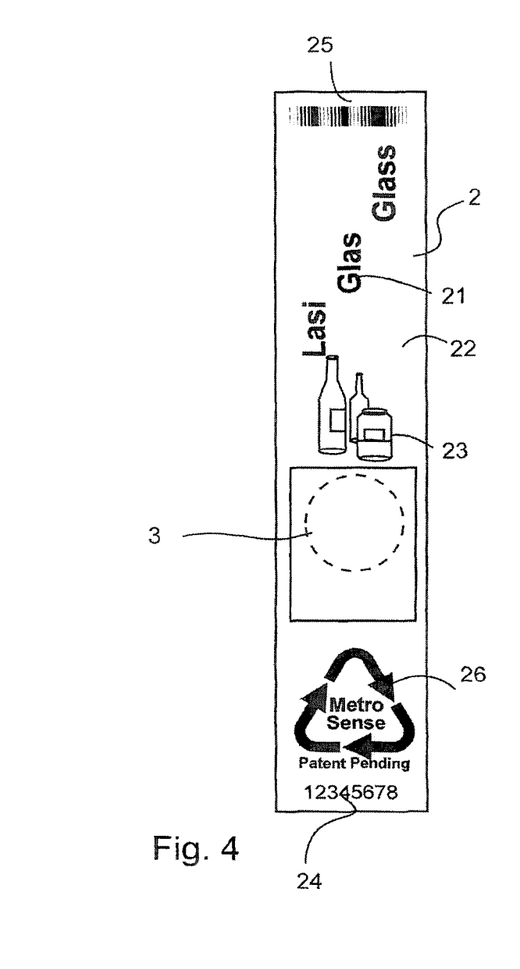
FIG. 4 presents one embodiment of a closing means of a system according to the invention.

FIG. 4 presents one preferred embodiment of a closing means 2. In addition to an RFID identifier 3, the closing means 2 is also provided with other identifiers 21, 22, 23, 24, 25, 26. In the embodiment of the figure the closing means comprises a text marking 21, which expresses in words the type of waste for which the closing means in question is intended. The verbal marking 21 can be made in a number of different languages. A color code 22 is formed on the surface of the closing means 2, which color code can be a part of the area of the closing means or the size of the whole closing means. In addition, the closing means 2 can comprise a picture code or drawing code 23, which expresses the type of waste for which the closing means is intended. The closing means can comprise a customer code 24, which expresses the waste-producer community, such as a household, company or community. The customer code 24 is typically alphanumeric information. Furthermore, the closing means can comprise a barcode 25 or other visible graphical code. Furthermore, the closing means of waste groups intended for recycling can comprise a code descriptive of recycling. In addition, the closing means 2 can comprise the information or advertisements of a manufacturer or marketer. Furthermore, the closing means can comprise the name or other identifier of a local waste management company or community.

Figure 5:
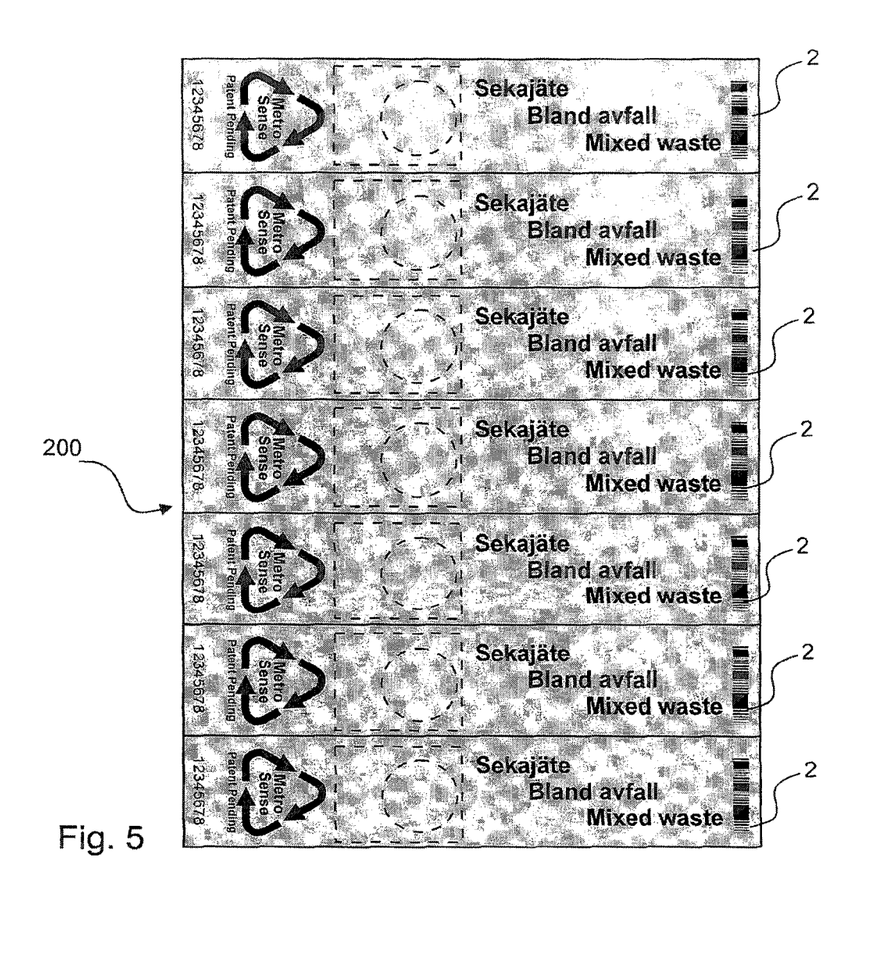
FIG. 5 presents one embodiment of a closing means sheet of a system according to the invention.

FIG. 5 presents a closing means sheet 200 of one type of waste, which closing means sheet comprises a number of closing means 2. The closing means 2 of a closing means sheet can be detached according to need, e.g. individually.

Figure 6:
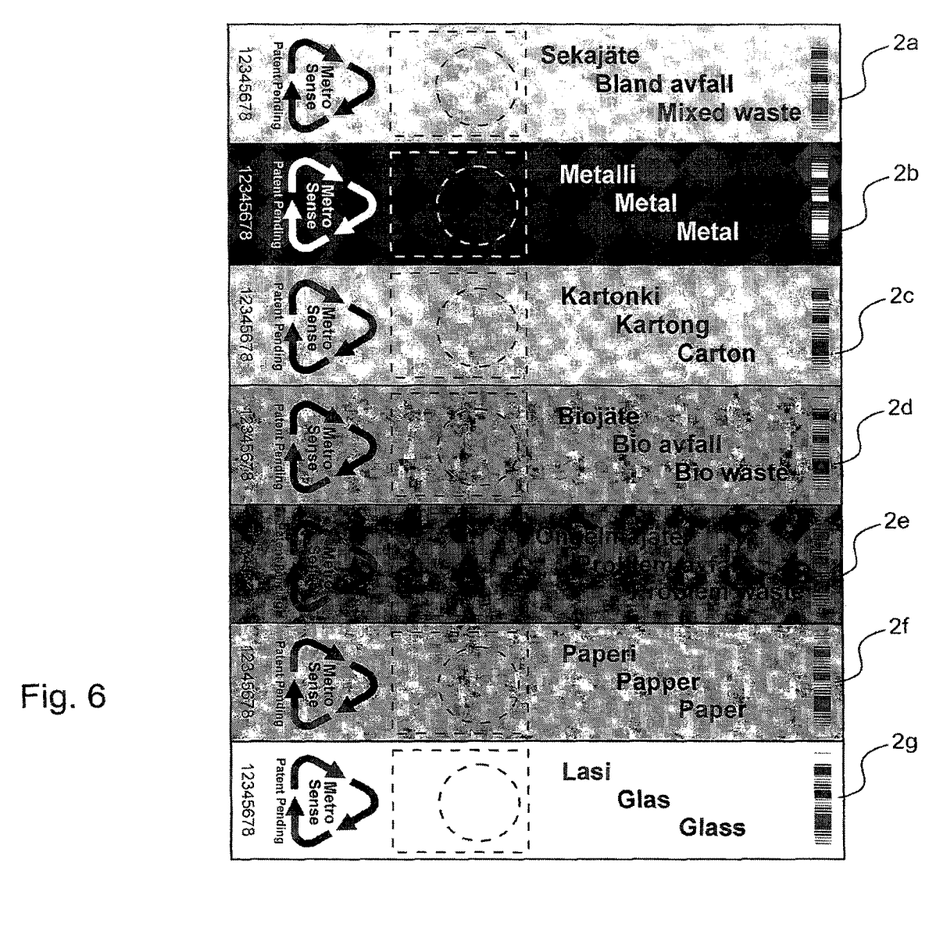
FIG. 6 presents some embodiments of some closing means of a system according to the invention.

FIG. 6 presents some examples of different closing means 2a, 2b, 2c, 2d, 2e, 2f, 2g, which are intended for closing waste bags containing different types of waste. The embodiment in FIG. 6 presents a closing means 2a intended for mixed waste, a closing means 2b intended for metal, a closing means 2c intended for cardboard waste, a closing means 2d intended for biowaste, a closing means 2e intended for hazardous waste, a closing means 2f intended for paper, and a closing means 2g intended for glass. Also other waste materials can be marked with their own identifiers according to need.

The combination according to the invention of a closing means 2 and an RFID identifier 3 can be utilized in connection with a waste transport system e.g. as follows. Closing means according to the invention, i.e. combinations of a closing means and an RFID identifier, are distributed or otherwise delivered to households or other waste producers. The RFID identifier comprises the code or corresponding identifier of each waste producer, with which code a producer of waste can if necessary be identified. According to one preferred embodiment the closing means 2 comprises an identification code, such as a color code, according to which the closing means is used in the system in the manner agreed in connection with each sorted waste bag. The color code can be the size of the whole closing means or a pattern or text. It is conceivable that a color code of a certain color is defined for mixed waste, a second color code for biowaste, correspondingly own color codes for recyclable materials. In this case users equip a waste bag comprising a certain type of waste with a closing means that comprises a corresponding color code.

In this way the waste bag wanted by the user can be used in connection with any different waste allotment whatsoever, and a waste producer marks a waste bag only with a color code of a closing means and RFID identifier according to the invention. Typically also an RFID identifier also already contains the waste type in connection with which it is used.

According to one preferred embodiment of the invention, a reader of an RFID identifier can be in connection with a lid or a hatch of a waste bin or of a waste disposal point, which allows feeding only the waste intended for the waste bin or waste disposal point in question into the bin in question. Particularly in connection with a pneumatic waste transport system, only one disposal point can in this case be conveniently used for different materials, in which case the system sorts waste into different allotments later according to an RFID identifier. At the same time, supplying waste material without an RFID identifier according to the invention into a disposal point of the system can also be prevented.

An RFID identifier can be used to register the amount of waste bought by a certain user, in which case invoicing principles can be changed. On the other hand, a user can be rewarded for sorting waste, e.g. by reducing the waste transport fee of waste that is fit for recycling.

According to a typical embodiment, the closing means is a closing sticker tape, which is an RFID sticker tape of the color of the waste allotment, which sticker tape comprises e.g. a text identifier according to the type of waste. In addition, an identification number or other identifier, which is separately specified according to each household, housing company, company other waste producer that produces waste, can be formed for a closing means and/or RFID identifier.

The invention can thus be utilized by using the ordinary plastic carrier bags of a shop, which are closed with a closing means 2 according to the invention. The carrier bag is filled with waste and closed by knotting its carrying loops. A typical way is to tie at first one knot, after which a closing means, preferably a sticker tape, is placed on top of the knot, and fixed over the knot of the carrier bag. After that a second knot is made with the carrying loops. The RFID identifier in this case remains partly protected and avoids transport damage. The closing means according to the invention also prevents the opening of the knots of the waste bag.

In the waste sorting center to which the waste bags are transported with conventional garbage trucks or in some other way, the waste bags are sorted into different waste allotments on the basis of the information given by the RFID identifiers 3. After this the waste bags 1 are ripped open and the bags are removed from the rest of the waste. The RFID identifier of the closing means according to the invention can still be used as a verification by the aid of a reader means that the waste bags have been removed from the sorted waste allotments.

The invention can be applied according to one preferred embodiment so that dedicated closing means, which comprise RFID identifiers, are supplied to each household. This assists sorting. In addition, by means of the combination of a closing means and RFID identifier according to the invention, it is easy to demonstrate where the costs of the waste handling system are generated. Fees can be allocated to waste producers more accurately than earlier.

According to one preferred embodiment, households have a fixed waste charge and receive a credit for each waste bag sorted in a sorting center. Based on the automatic reading of RFID identifiers, the system can allocate the sorted waste by means of an information system so that the credit goes to the correct target.

Although a combination of a closing means and an RFID identifier is the most preferred embodiment, the system does not exclude an alternative wherein waste bags comprising a ready RFID identifier are, if desired, used instead of a closing means. This however requires separate waste bags provided with an RFID identifier, for each waste allotment.

Sorting on the basis of an RFID identifier in a sorting center is very easy, as also is identification of a household. An RFID identifier gives numerous opportunities in waste sorting.

The invention thus relates to a method in a waste handling system, in which waste or recyclable material is transported in carrier bags, bags or sacks 1 to a disposal point, such as to a waste bin of a waste room WR1, WR2, WR3, and from there onwards by a transport vehicle for further processing. An RFID identifier 3 is used in connection with the carrier bag, bag, sack 1 or corresponding used in waste transport, preferably a closing means 2 that is provided with an RFID identifier 3 is used in closing, or as verification of the closing of, the carrier bag, bag, sack 1 or corresponding, and in which method a sensor S1, S2, S3 is arranged in connection with, or in the proximity of, a disposal point, such as a waste room WR1, WR2, WR3, of the waste system, the information read from the RFID identifier of which sensor is transmitted to a control unit CS, which is fitted to control the waste transport system, or a part of it, on the basis of the information given by the RFID identifier.

According to one preferred embodiment, the carrier bags, bags and sacks 1 or corresponding used in waste transport are placed into at least one waste bin B1, B2, B3, B4, B5, B6 in a disposal point, such as in a waste room WR1, WR2, WR3.

According to one preferred embodiment, in the method a carrier bag, bag or sack 1, such as a plastic carrier bag, plastic sack or plastic bag, that is freely chosen by the user is used in waste transport.

According to one preferred embodiment the closing means 2 comprises at least one first visible identifier 21, 22, 23, such as a pattern, color, code, marking or corresponding, which defines the type of waste material or recyclable material contained in a bag, carrier bag, sack or corresponding that the closing means 2 is used to close.

According to one preferred embodiment the closing means 2 comprises at least one second visible identifier 24, 25, such as a marking, code or corresponding, which expresses the user community, such as a household.

According to one preferred embodiment in the method wastes are sorted into different allotments on the basis of information given by RFID identifiers 3.

According to one preferred embodiment an RFID identifier 3, more particularly an RFID identifier arranged in a closing means 2, is used to optimize the operation of a transport system.

According to one preferred embodiment in the method control data is transmitted from the control unit CS to the terminal T1 of one or more waste transport vehicles, such as a garbage truck (V1), or of the driver of a transport vehicle.

According to one preferred embodiment from a disposal point information is transmitted, on the basis of which the filling degree of the waste bins B1, B2, B3, B4, B5, B6 of a disposal point, such as of a waste room WR1, WR2, WR3, or the amount of a certain type of waste in a disposal point, such as in a waste room, can be determined.

According to one preferred embodiment in the method a sensor S1, S2, S3 also sends information to be stored in the memory of an RFID identifier 3.

According to one preferred embodiment by means of the information transmitted by a sensor S1, S2, S3 of a disposal point, one or more of the following are optimized: the distance traveled by transport vehicles, the route, the volume needed for wastes, the volume needed for different allotments of waste, the available volume, the volume available for different allotments of waste.

According to one preferred embodiment control data, such as for the most suitably optimized route of the transport vehicle, is transmitted from the control system CS to the terminal T1 of a transport vehicle or of its driver.

The invention also relates to a waste transport system, in which waste or recyclable material is transported in carrier bags, bags or sacks 1 to a disposal point, such as to a waste bin of a waste room WR1, WR2, WR3, and from there onwards by a transport vehicle for further processing. An RFID identifier 3 is arranged in connection with the carrier bag, bag, sack 1 or corresponding used in waste transport, preferably in a closing means 2 used in closing, or as verification of the closing of, the carrier bag, bag, sack 1 or corresponding, and in that a sensor S1, S2, S3 is arranged in connection with, or in the proximity of, a disposal point, such as a waste room WR1, WR2, WR3, of the waste system, the information read from the RFID identifier of which sensor is transmitted to a control unit CS, which is fitted to control the waste transport system, or a part of it, on the basis of the information given by the RFID identifier.

According to one preferred embodiment the system comprises at least one waste bin B1, B2, B3, B4, B5, B6 in a disposal point, such as in a waste room WR1, WR2, WR3.

According to one preferred embodiment in the system a carrier bag, bag or sack 1, such as a plastic carrier bag, plastic sack or plastic bag, that is freely chosen by the user is used in waste transport.

According to one preferred embodiment the closing means 2 comprises at least one first visible identifier 21, 22, 23, such as a pattern, color, code, marking or corresponding, which defines the type of waste material or recyclable material contained in a bag, carrier bag, sack or corresponding that the closing means 2 is used to close.

According to one preferred embodiment the closing means 2 comprises at least one second visible identifier 24, 25, such as a marking, code or corresponding, which expresses the user community, such as a household. According to yet another embodiment, a closing means comprises the name or other identifier of a local waste management company or community.

According to one preferred embodiment in the system wastes are sorted into different allotments on the basis of information given by the closing means and/or the RFID identifiers 3.

According to one preferred embodiment an RFID identifier 3, more particularly an RFID identifier arranged in a closing means 2, is used to optimize the operation of a transport system.

According to one preferred embodiment in the system control data is transmitted from the control unit CS to the terminal T1 of one or more waste transport vehicles, such as a garbage truck V1, or of the driver of a transport vehicle.

According to one preferred embodiment from a disposal point information is transmitted to a control system CS, on the basis of which the filling degree of the waste bins B1, B2, B3, B4, B5, B6 of the disposal point, such as of a waste room WR1, WR2, WR3, or the amount of a certain type of waste in a disposal point, such as in a waste room, can be determined.

According to one preferred embodiment a sensor S1, S2, S3 is also fitted to send information to be stored in the memory of an RFID identifier 3.

According to one preferred embodiment by means of the information transmitted by a sensor S1, S2, S3 of a disposal point, one or more of the following are optimized: the distance traveled by transport vehicles, the route, the volume needed for wastes, the volume needed for different allotments of waste, the available volume, the volume available for different allotments of waste.

According to one preferred embodiment control data, such as for the most suitably optimized route of the transport vehicle, is transmitted from the control system CS to the terminal T1 of a transport vehicle or of its driver.

The use of an RFID identifier in connection with a pneumatic waste transport system is described in publication WO 2005/118435. The use of an RFID identifier in the sorting of waste is presented in publication WO 2006/096101.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method in a waste handling system wherein waste or recyclable material is transported in carrier bags (1) to a disposal point (WR1, WR2, WR3) and thereafter transported for further processing comprising the following steps:
   providing a closing means (2) comprising an RFID identifier (3) for closing the carrier bag (1) or securing the closing of the carrier bag (1);
   arranging a sensor (S1, S2, S3) of the disposal point in connection with the disposal point (WR1, WR2, WR3) of a waste system, wherein information read from the RFID identifier by the sensor of the disposal point is transmitted to a control unit (CS) for controlling a waste transport system, or the disposal point of the waste system, on the basis of information given by the RFID identifier; and
   transmitting from the control unit (CS) to a terminal (T1) of one or more waste transport vehicles (V1), or a driver of a transport vehicle information from the disposal point, on a basis of a filling degree of waste bins (B1, B2, B3, B4, B5, B6) of the disposal point (WR1, WR2, WR3), or an amount of a certain type of waste in a disposal point (WR1, WR2, WR3) can be determined.

2. The method according to claim 1, wherein a wall of the disposal point surrounds the waste bins in the disposal point.

3. The method according to claim 1, wherein the carrier bags include plastic carrier bags, or plastic sacks freely chosen by a user of the waste transport system.

4. The method according to claim 1,
   wherein the closing means for affixing to each of the carrier bags includes at least one first visible identifier,
   wherein the first visible identifier is a pattern, a color code, a bar code, a picture code, an alphanumeric code, or a marking which defines the type of waste material or recyclable material contained in each of the carrier bags on which the closing is used.

5. The method according to claim 1,
   wherein the closing means for affixing to each of the carrier bags includes at least one second visible identifier,
   wherein the second visible identifier is a marking, a customer code, or a color code which corresponds to a user community, or to a household.

6. The method according to claim 1, wherein the bags are sorted into different allotments and placed in different ones of the waste bins in the disposal point based on information given by the closing means, and the information on the RFID identifier in the closing means for affixing to each of the carrier bags.

7. The method according to claim 1, wherein each one of the RFID identifiers is arranged on a corresponding one of the closing means for affixing to each of the carrier bags, the information on the RFID identifiers being used to optimize operation of the waste transport system.

8. The method according to claim 1, wherein the sensor is attached to a wall of the disposal point and surrounds the waste bins in the disposal point, and
   the sensor sends the information to be stored in a memory of the RFID identifier in the closing means for affixing to each of the carrier bags in the waste bins in the disposal point.

9. The method according to claim 1, and further including multiple disposal points provided with multiple sensors, and
   a specific multiple sensor is attached to a wall or ceiling surrounding the waste bins in each of the multiple disposal points, and
   the information transmitted from the RFID identifier in the closing means for affixing to each of the carrier bags to the sensor on the wall or ceiling of each of the multiple disposal points is then transmitted to the control unit in order to:
   optimize a distance traveled by each of the transport vehicles,
   optimize a route for each of the transport vehicles,
   optimize a volume needed for waste collection,
   optimize a volume needed for different allotments of the waste based on the information stored in a memory of the RFID identifier in the closing means for affixing to each of the carrier bags in the waste bins in each of the multiple disposal points,
   optimize an available volume for the waste at each of the multiple disposal points, and
   optimize an available volume for different allotments of the waste based on the information stored in the memory of the RFID identifier in the closing means for affixing to each of the carrier bags in the waste bins in each of the multiple disposal points.

10. The method according to claim 1, the method further comprising:
    reading information from the RFID identifier in the closing means for affixing to each of the carrier bags by the sensor attached to a wall of the disposal point that surrounds the waste bins in the disposal point, and
    transmitting the control data for optimizing a route for each of the waste transport vehicles from the control unit to the terminal of each of the waste transport vehicles, or to the terminal of the driver thereof,
    wherein the wall of the disposal point surrounds the waste bins in the disposal point.

11. A waste transport system wherein waste or recyclable material is transported in carrier bags (1) to a disposal point (WR1, WR2, WR3) and thereafter transported for further processing, comprising:
    an RFID identifier (3) positioned in a closing means (2), the closing means (2) arranged for closing the carrier bag (1) or securing the closing of the carrier bag (1); and
    a sensor (S1, S2, S3) of the disposal point positioned in connection with the a disposal point of the waste system for reading information from the RFID identifier and for transmitting the information to a control unit (CS) for controlling the waste transport system, or the disposal point of the waste system, on the basis of the information given by the RFID identifier; and
    the control unit (CS) transmits information from a disposal point to a terminal (T1) of one or more waste transport vehicles or of the driver of a transport vehicle, on a basis of which information the filling degree of waste bins (B1, B2, B3, B4, B5, B6) of the disposal point, or the amount of a certain type of waste in the disposal point, can be determined.

12. The waste transport system according to claim 11, wherein a wall of the disposal point surrounds the waste bins in the disposal point.

13. The waste transport system according to claim 11, wherein the carrier bags include plastic carrier bags, or plastic sacks freely chosen by a user of the waste transport system.

14. The waste transport system according to claim 11, wherein the closing means for affixing to each of the carrier bags includes at least one first visible identifier,
wherein the first visible identifier is a pattern, a color code, a bar code, a picture code, an alphanumeric code, or a marking which defines the type of waste material or recyclable material contained in the carrier bags on which the closing means is used.

15. The waste transport system according to claim 11, wherein the closing means for affixing to each of the carrier bags includes at least one second visible identifier,
wherein the second visible identifier is a marking, a customer code, or a color code which corresponds to a user community, or to a household.

16. The waste transport system according to claim 11, the carrier bags are sorted into different allotments and placed in different ones of the waste bins in the disposal point based on information given by the closing means, and/or the information on the RFID identifier in the closing means for affixing to each of the carrier bags.

17. The waste transport system according to claim 11, wherein the RFID identifier is arranged on a corresponding one of the closing means for affixing to each of the carrier bags, the information from the RFID identifiers being used to optimize operation of the waste transport system.

18. The waste transport system according to claim 11, and further including multiple disposal points provided with multiple sensors, and
a specific multiple sensor is attached to a wall or ceiling surrounding the waste bins in each of the multiple disposal points, and
the information transmitted from the RFID identifier in the closing means for affixing to each of each of the carrier bags to the sensor attached to the wall or ceiling in each of the multiple disposal points is then transmitted to the control unit in order to:
optimize a distance traveled by each of the transport vehicles,
optimize a route for each of the transport vehicles,
optimize a volume needed for waste collection,
optimize a volume needed for different allotments of the waste based on the information stored in a memory of the RFID identifier in the closing means for affixing to the carrier bags in the waste bins in each of the multiple disposal points,
optimize an available volume for the waste at each of the multiple disposal points, and
optimize an available volume for different allotments of the waste based on the information stored in the memory of the RFID identifier in the closing means for affixing to the carrier bags in the waste bins in each of the multiple disposal points.

19. The waste transport system according to claim 11, wherein information read from the RFID identifier in the closing means for affixing to each of the carrier bags by the sensor is transmitted to the control unit control data for optimizing a route for each of the one or more waste transport vehicles is transmitted from the control unit to the terminal of each of the waste transport vehicles, or to the terminal of the driver thereof,
wherein a wall of the disposal point surrounds the waste bins in the disposal point.

20. The method in a waste transport system according to claim 1, wherein the method further comprises the step of:
continuously transmitting the information from the RFID identifier in the closing means for affixing to each of the carrier bags in the waste bins disposed at the disposal point, via the sensor to the control unit, thereby enabling an operator of the control unit to continuously monitor the filling degree of each of the waste bins, and the amount of specific waste materials in each of the waste bins in the disposal point,
wherein a wall of the disposal point surrounds the waste bins in the disposal point.

21. The waste transport system according to claim 11, the information transmitted from the RFID identifier in the closing means for affixing to each of the carrier bags in each of the waste bins disposed at the disposal point, via the sensor to the control unit is transmitted continuously, thereby enabling an operator of the control unit to continuously monitor the filling degree of each of the waste bins, and the amount of specific waste materials in each of the waste bins in the disposal point,
wherein a wall of the disposal point surrounds the waste bins in the disposal point.

22. The waste transport system according to claim 11, wherein the RFID identifier in the closing means provides a temperature alarm.

23. The waste transport system according to claim 11, wherein the closing means for affixing to each of the carrier bags is arranged in a manner such that a portion of each of the closing means for affixing to each of the carrier bags covers a surface of each of the RFID identifiers.

24. The waste transport system according to claim 11, wherein the sensor is attached to a wall of the disposal point and surrounds the waste bins in the disposal point, and
the sensor sends information to be stored in a memory of the RFID identifier in the closing means for affixing to each of the carrier bags in the waste bins in the disposal point.

25. The method according to claim 1, wherein the RFID identifiers in the multiple waste containers can be read at the disposal point by one sensor.

26. The waste transport system according to claim 11, wherein the RFID identifiers in the multiple waste containers can be read at the disposal point by one sensor.

* * * * *